Feb. 21, 1967   J. W. PARKER   3,304,805
TURBOMECHANICAL DRIVE MECHANISMS
Filed July 1, 1964   4 Sheets-Sheet 1
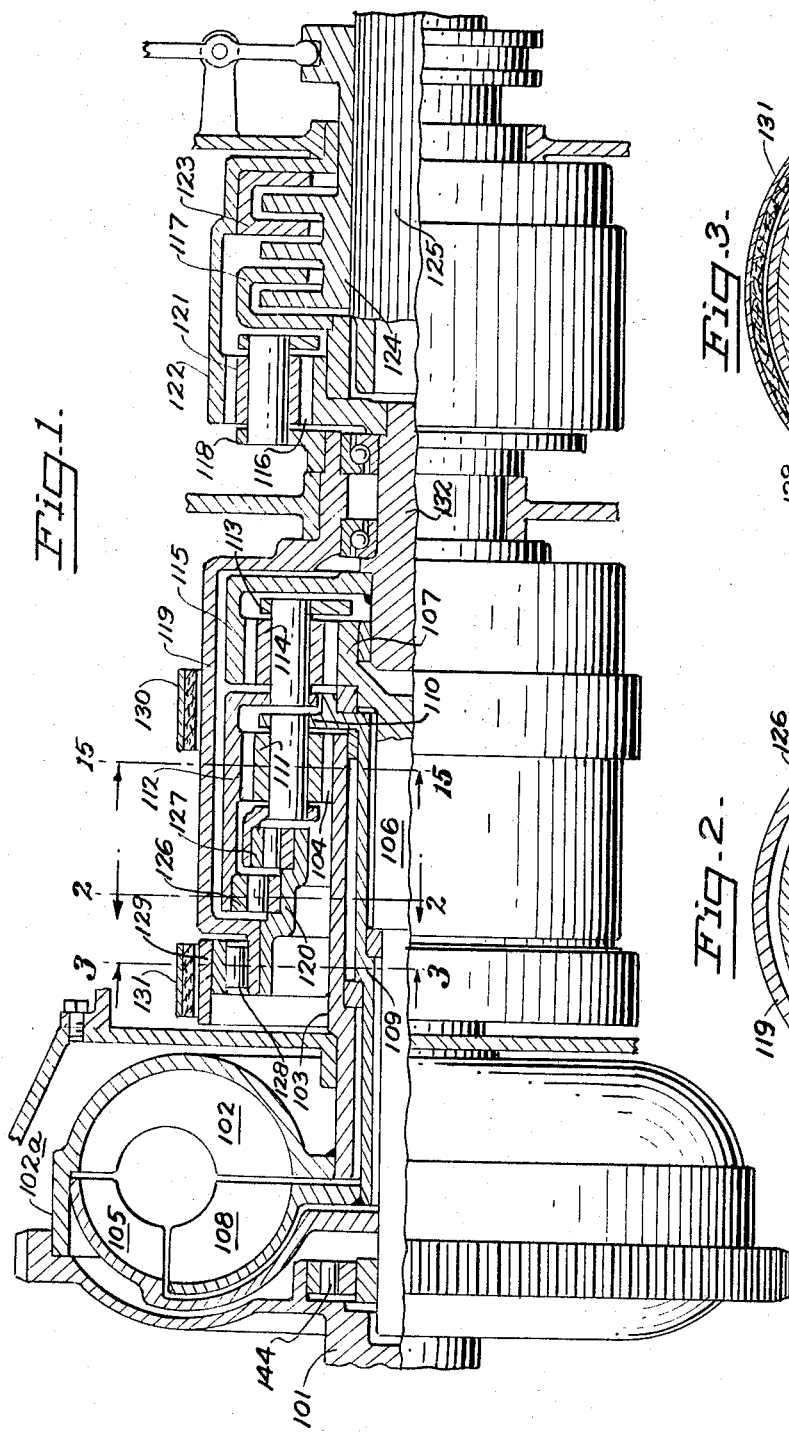
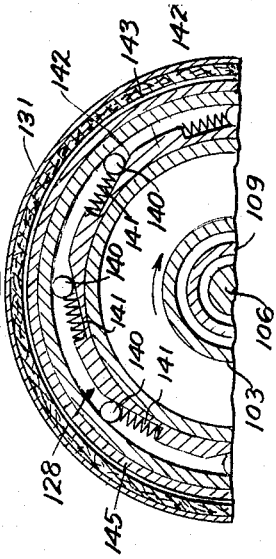
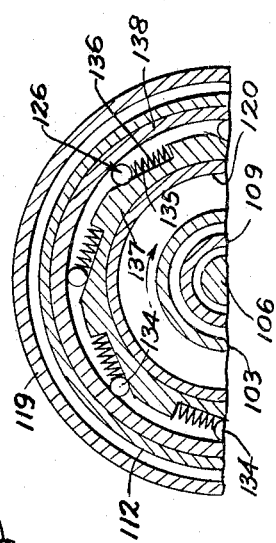
INVENTOR.
JOSEPH W. PARKER
BY
Owen, Wickersham, Erickson
ATTORNEYS

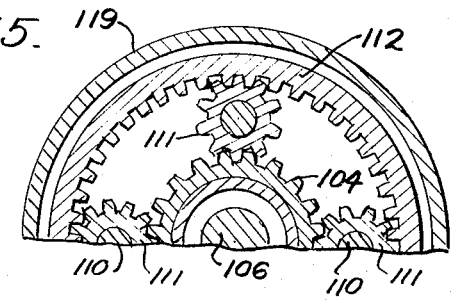
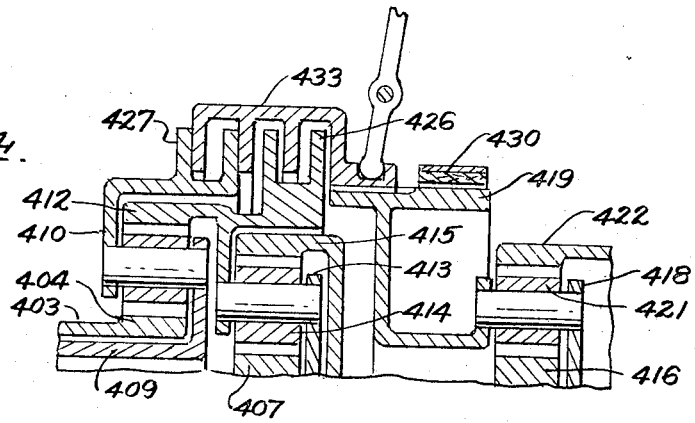
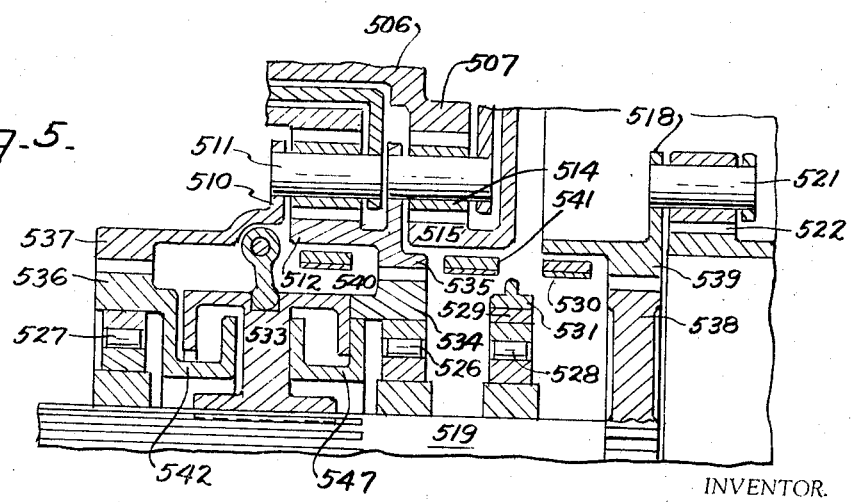

Feb. 21, 1967     J. W. PARKER     3,304,805

TURBOMECHANICAL DRIVE MECHANISMS

Filed July 1, 1964     4 Sheets-Sheet 3

INVENTOR.
JOSEPH W. PARKER
BY
Owen, Wickersham & Erickson
ATTORNEYS

INVENTOR.
JOSEPH W. PARKER
BY
Owen, Wickersham, Erickson
ATTORNEYS

United States Patent Office 3,304,805
Patented Feb. 21, 1967

3,304,805
TURBOMECHANICAL DRIVE MECHANISMS
Joseph W. Parker, 2648 Forest Hill Drive,
San Jose, Calif. 95130
Filed July 1, 1964, Ser. No. 379,484
21 Claims. (Cl. 74—677)

My invention relates to an improvement in transmissions of the turbomechanical type. This application is a continuation-in-part of my application Serial No. 111,898, filed May 18, 1961, now abandoned.

My new transmission is capable of applying power to an automotive vehicle in even, uninterrupted flow from an internal combustion engine to the wheels, as the vehicle moves from a standing start to cruising speed. Heretofore, transmissions capable of such operation have been, at best, an expensive luxury, yet there has been a crying need for such operation in vehicles for which it has not been available. For example, even power flow has been accomplished to some extent in high-powered domestic automobiles, but only with considerable sacrifice of fuel economy. On the other hand, in the larger vehicles, extensive gearing has been required to merely narrow the gap between shifts; thus for trucks, buses, and off-road equipment some very elaborate close-ratio combinations are available, both manual and automatic, but, even with these, the operators are denied the availability of completely smooth power throughout the entire acceleration range. And, of course, such operation would contribute to more than the ease of the driver.

The hydraulic transmission is potentially capable of providing perfect continuity in speed change, but until now its development has left much to be desired, largely because of the rather limited ways, a few of which are mentioned hereinafter, in which use is made of the basic component of said hydraulic transmission known as the hydrodynamic unit or torque converter.

In some automobile operations the torque converter has been utilized exclusively in the drive between the engine and the final gear. While such use has given the driver a sensation of power and smoothness, at the same time this very feeling has obscured the fact that all too often the torque converter has been required to operate outside its efficiency limits.

In other cases the torque converter has been teamed with gearing so as, in effect, to merely cushion the change from one gear set-up to another. Consequently, an engine that could be highly efficient has had at times to run at inefficient speeds. Often, a more flexible but less efficient engine has had to be used.

A third type of use of the torque converter or torque converter coupling has been in the so-called torque divider, wherein converter elements are interconnected through gearing for parallel division of the input torque, enabling a fair degree of overall efficiency with stepless performance. Indeed, past developments of this general type have so well combined smoothness with a wide torque ratio range that they have been used in both automobiles and diesel locomotives.

The present invention greatly extends the diversity and merit of the torque divider type of transmission, so that the wide range of requirements associated with it can be even more fully and universally met by its further development as set forth herein where it has been improved to correct certain shortcomings.

Of prime importance to the use of the torque divider transmission to optimum advantage is a provision whereby the converter members may at all times be engaged at efficient rotational speeds. Such a provision should not be at the expense of completely stepless speed change, provided constant throttle is applied, throughout the entire operating range.

A complementary provision should be made for highly sensitive and effective response to abrupt changes in torque demand over a wide operating range. For example, when the engine throttle is suddenly opened for acceleration from cruising speed to top speed, any discontinuity in the torque speed relation should be no more than is absolutely necessary to most effectively utilize the torque converter.

It is therefore a principal object of my invention to provide a fully automatic transmission satisfying these requirements. My new transmission is thereby flexible enough to accommodate any engine under all conditions, and is especially adapted for a most advantageous use with constant-speed engines. Accordingly, and more particularly, it is a principal object of my invention to provide a hydrodynamic transmission wherein the torque converter-coupling and the gearing may cooperate throughout the entire speed range to yield the torque multiplication ratio as continuously as the converter-coupling might in operation as a complete transmission. Thus, the utility ratio in the torque converter may be, in effect, multiplied in stepless manner in the gearing herein embodied.

It is further intended that for any change in speed only the high efficiency portion of the converter or coupling phase or a combination of the two may be necessarily involved.

In carrying out these objectives members of the torque converter are connected to the load and interconnected through the gearing so as to be capable of cooperation in continuous manner from the very low speed condition obtaining at breakaway (wherein high torque multiplication is secured in the gearing without excessive slippage between converter driver and runner) to the high speed condition (wherein the converter progresses through the coupling phase toward unit rotation with the planetary gearing).

Another object of the invention, supplementary to the foregoing, is to provide a transmission of the type described and having the operating characteristics thereof, rendered flexible as to the torque multiplication ratios obtainable in conjunction with various transmission speed ratios in accordance with operating requirements. The means for rendering these operating characteristics flexible, provide for conditioning the transmission to divide the torque at any time in the manner yielding the highest overall efficiency. In carrying out this objective, apparatus is included in the transmission for selecting the operating limits for reaction elements.

Other features, objects, and advantages of the invention will become apparent from the following description. By way of explanation, the invention is illustrated and described so as to suggest automotive use although it is adaptable for a variety of applications.

In the drawings:

FIG. 1 is a view in side elevation and partly in section of a transmission embodying the principles of the invention.

FIG. 2 is a fragmentary view in section of the upper half of a one-way clutch, taken along the line 2—2 in FIG. 1.

FIG. 3 is a view similar in type to FIG. 2 of a one-way brake or backstop, taken along the line 3—3 in FIG. 1.

FIG. 4 is a fragmentary view in side elevation and in section of a portion of a transmission generally like that of FIG. 1 but showing a portion that has been modified.

FIG. 5 is a view similar to FIG. 4 of a portion of another modified form of the transmission of this invention.

FIG. 15 is a view in section taken along the line 15—15 in FIG. 1 through one set of planetary gears.

Figure 6:
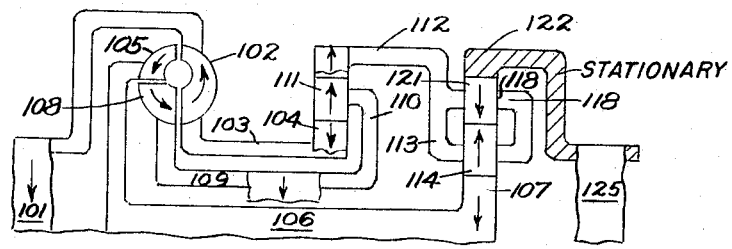
FIG. 6 is a longitudinal simplified diagrammatic or schematic view of the transmission of FIG. 1 during normal forward drive operation in its initial no-output condition. Shading is used to indicate stationary elements, rather than to indicate sectioning.

*A compact transmission for use in automobiles and the like (FIGS. 1–3 and 15)*

FIG. 1 shows one form of the invention utilizing a three element torque converter-coupling. An input shaft 101, a pump 102, and a rotating housing 102a integral therewith, an outer sleeve shaft 103 and a sun gear 104 of a first planetary gear set are connected to be driven, as by a crankshaft of an internal combustion engine in the vehicle or by any source of motive power. A first turbine 105 is drivingly connected with a main shaft 106 and a sun gear 107 of a second planetary gear set, and receives oil directly from the pump 102, thereby performing as a secondary pump and primary runner in mutual reaction with a second turbine 108. A one-way clutch, indicated generally at 144, is mounted between the first turbine 105 and the input shaft 101 to prevent the turbine 105 from overrunning the pump 102. The second turbine 108, being in driving connection with an inner sleeve shaft 109 and a planet carrier 110 of the first planetary gear set (see FIG. 15), is of such construction, positioning in the converter, and connection in the transmission as to perform as a secondary runner in differential driving cooperation with the first turbine 105, or as a rotatable guide wheel capable of alternatingly coupling and multiplying the input torque and cooperating with reaction elements in the gearing to control the division of torque in the transmission.

Planet gears 111 of the first gear set are pinioned on the planet carrier 110 and are meshed with the sun gear 104 and an annulus gear 112. The annulus gear 112 is integrally connected with a planet carrier 113 of the second gear set. Planet gears 114 are pinioned on the planet carrier 113 and are meshed with the sun gear 107 and an annulus gear 115. The annulus gear 115 is drivingly connected by means of an intermediate shaft 132, with a sun gear 116 of a third gear set and a reverse output clutch, indicated generally at 117. A planet carrier 118 is integrally connected with an outer drum 119, and an inner drum 120, and planet gears 121 are pinioned on the carrier 118 and are meshed with the sun gear 116 and an annulus gear 122, the latter being integrally connected with a forward output clutch, indicated generally at 123. A slide clutch coupling, indicated generally at 124, is movable on a splined output shaft 125 and is faced for selective connection with each of the clutches 117 and 123.

A one-way clutch, indicated generally at 126, is mounted between an extension of the annulus gear 112 and the inner drum 120, as shown in transverse section in FIG. 2. The clutch rollers 134 are forced by action of springs 135 onto shoulders 136 of an inner race 137 so as to prevent retrograde rotation of the inner race 137 relative to that of the outer race 138. In this manner, the clutch 126 enables the annulus gear 112 to free-wheelingly drive the drums 120 and 119 and the planet carrier 118 in the rotational direction of the input shaft 101, or to reactively limit the members 120, 119, and 118 in counterclockwise rotation to the speed of the annulus gear 112.

Another one-way clutch, indicated generally at 127, which may have the same type of structure as the clutch 126, is mounted between the drum 120 and the planet carrier 110 and freewheelingly limits the rotation of the drums 120 and 119 and the planet carrier 118 to the speed of the planet carrier 110 in the direction of rotation of the input shaft 101 in a manner counter-rotational to but otherwise similar to that of the one-way clutch 126.

A one-way brake or backstop of any convenient type indicated generally at 128 (see FIG. 3; note that its structure is like that of the clutch 126, having rollers 140, springs 141, shoulders 142 on an inner race 143, and an outer race 145) is mounted between the drum 120 and a drum 129 and may freewheelingly prevent the drums 120 and 119 and the planet carrier 118 from rotating retrograde in relation to the direction of rotation of input shaft 101. The drums 119 and 129 may be held as desired by friction elements 130 and 131, respectively, actuated by any convenient means (not shown).

In the invention as herein exemplified the reaction train in the gearing couples the planet carrier 118 (the final reaction element) to the planet carrier 110 that is rotatable with the second turbine 108. In the main line of reaction between the planet carriers 118 and 110 are the drums 119 and 120 and, alternately, (1) the one-way clutch 126, the annulus gear 112, and the planet gears 111, or (2) the one-way clutch 127.

To summarize, the transmission of FIG. 1 has an input shaft 101, an output shaft 125, a pump 102 and turbine members 105 and 108 of a hydrodynamic torus and is characterized by a plurality of epicyclic gear trains 104, 111, 112 and 107, 114, 115 in differential connection between the pump 102 and turbine members 105, 108 and the output shaft 125. E.g., the pump 102 is connected to the sun gear 104 and the turbine 108 is connected to pivot the planet gears 111, the annulus gear 112 is connected to pivot the planet gears 114, the turbine 105 is connected to the sun gear 107, and the annulus gear 115 drives the output shaft 125. This arrangement constitutes means for reactively inducing turbine rotation in the same direction as pump rotation under an initial condition wherein the input shaft 101 is rotated and the output shaft 125 is at rest, and it constitutes means for progressing the transmission from the initial condition toward overall coupling as the turbine members 105, 108 are progressed toward coupling with the pump 102.

Preferably, the annulus gear 115 drives the output shaft 125 through the third set of epicyclic gear trains 116, 121, 122. E.g., the annulus gear 115 is connected to the sun gear 116, and the annulus gear 122 is connected through a clutch 123 and clutch coupling 124 to the output shaft 125. The planet gears 121 are connected through the drums 119 and 120 and the one-way clutch 126 to the annulus gear 112 to provide reaction means whereby the first turbine 105 may effectively underdrive the output shaft 125; and the planet gears 111 and 121 can be held by means of the interlocking action of the one-way brake 128 and the one-way clutch 127 to provide reaction means whereby the first turbine 105 may effectively overdrive the output shaft 125. Thus the combination provides means for progressing the transmission from its initial condition toward overall coupling as the rotation of the turbine member 105 is compounded in the gearing to alternatingly underdrive and overdrive the output shaft 125, in response to the mutual reaction of the turbine member 105 with the turbine member 108.

Operation of the FIG. 1 embodiment

For descriptive purposes, it will be assumed that the input and output shafts both rotate clockwise. As an example of gear ratios, the pitch ratios between the annulus gear and sun gear of the three planetary gear sets may be 2:1, 2:1, and 5:3, respectively.

The FIG. 1 embodiment: in neutral

For purposes of starting and idling the engine with a minimum of load thereon, a neutral condition is effected in the transmission when the output clutch coupling 124 is disconnected from both clutches 117 and 123, the output shaft 125 being thereby disconnected from the drive train.

The action of the fluid in the torque converter and the weight of transmission elements, of course, provide some drag on the engine. This drag may be eliminated in forms of the invention wherein the torque converter and parts connected therewith are so arranged as to permit convenient filling and emptying of the converter or wherein an engine disconnect clutch may be provided between input shaft and converter. Such forms might have the pump 102 and the turbine 105 switched (i.e., reversed) insofar as their positioning and connection in the transmission is concerned, obviating the necessity for the rotating housing, provided the one-way clutch 144 is then considered unnecessary.

Forms of the invention having this provision have operating characteristics similar, in general, to those of the preferred forms.

FIG. 1 transmission: normal forward drive

In normal forward drive operation, maximum smoothness is desired for breakway and, in accordance with the stated objectives, should obtain in conjunction with moderate slip ratios in the torque converter. In the accomplishment of this objective, the torque converter may perform as a coupling, provided the torque multiplication in the overall transmission and hence the speed reduction obtained in the gearing is sufficiently large. It is therefore essential, owing to the arrangement of the gearing, that the planet carrier 118, being the final reaction element, be able to rotate with the annulus gear 112. To set up the transmission for this condition, the clutch 123 is engaged by the clutch coupling 124, and all holding elements are inoperative. The partial reaction path now selected is from the planet carrier 118 to the annulus gear 112 through the drum 119 and 120 and the one-way clutch 126, interposed by reaction. The turbines 105 and 108 and the parts in the gearing connected therewith follow the pump 102 at reduced speed as other parts in the gearing rotate in idling manner; the planet carrier 118 and the annulus gears 112 and 115 and the parts connected therewith are forced by reaction in the gearing into counterclockwise rotation.

In the initial condition (shown diagrammatically in FIG. 6, wherein the annulus gear 115 and the sun gear 116 are omitted, since they may be omitted for all practical purposes), the output shaft 125 and the annulus gear 122 remain at rest as the engine speed is increased to gain sufficient torque for moving the vehicle.

Figure 7:
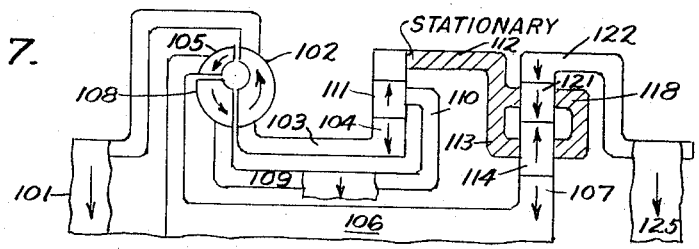
FIG. 7 is a view similar to FIG. 6 with the transmission of FIG. 1 in a low-speed condition during normal forward drive operation.

In the second condition, shown schematically in FIG. 7, the engine speed is sufficient for torque required to move the vehicle, at an exemplary 1800 r.p.m., the first turbine 105 and the parts connected therewith, under impulse from the pump 102, are moved in clockwise rotation to an exemplary speed of 1500 r.p.m.; the second turbine 108 and parts connected therewith, under impulse from the first turbine 105 increase in rotation to an exemplary clockwise speed of 600 r.p.m. as load reaction decreases on the planet carrier 118 and the annulus gear 112 and the planet carrier 113, permitting them to come to rest from counterclockwise rotation; the planet gears 114, being thus stopped in pivot position and spurred by the sun gear 110, drive the annulus gear 115 and the sun gear 116 in counterclockwise rotation at 750 r.p.m.; the planet gears 121, being also held in pivot position and thus spurred by the sun gear 116, drive the annulus gear 122 and the output shaft 125 in output rotation increasing from rest to 450 r.p.m.

In the third condition the output load is decreased and output momentum is increased to enable overall coupling in the transmission. As output and input torques are equalized, the output and input speeds are also equalized. Relative rotation of the parts in the planetary gearing as well as in the torque converter decreases until those components achieve unit rotation. The torque output during the foregoing operation is approximately indicated by the curve a of FIG. 14.

FIG. 1 transmission: first forward drive option

Under conditions wherein high torque ratio available for breakway in normal operation is desired for maximum tractive effort, and in accordance with the stated objectives, the reaction rotation in retrograde of various parts in the gearing allowed in the foregoing explanation may be prevented, and grounded reaction provided, by holding the drum 129, by actuating a friction element 131. The partial reaction path remains through the drums 119 and 120 and the one-way clutch 126, interposed by load reaction.

Figure 8:
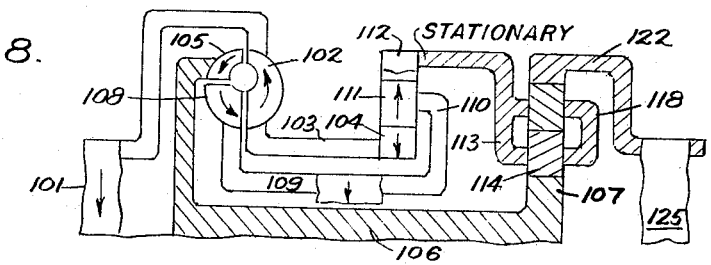
FIG. 8 is a similar view with the transmission of FIG. 1 in an optional type of forward drive wherein starting torque is increased, shown in its no-output condition.

In the initial condition, schematically shown in FIG. 8, the planet carrier 118 and the drums 119 and 120 are held against reaction rotation in retrograde by the backstop 128, now interposed, and the annulus gear 112 is now held from counterclockwise rotation by the reaction imposed thereon by one-way clutch 126, and from clockwise rotation by the load reaction imposed thereon through the gearing by means of the planet gears 114 and the planet carrier 113. Consequently during this interval the planet carrier 110 and the second turbine 108 rotatable clockwise therewith must rotate at one-third the speed of the input shaft 101 and the parts connected therewith, the second turbine 108 now performing as a clockwise rotating stator in negative reaction to multiply the torque in the fluid. The output shaft 125, the annulus gear 122, and all the other parts not immediately hereinabove described as being in motion remain at rest until sufficient power is available from the pump 102 to rotate the first turbine 105 and the parts connected therewith.

In the second condition, schematically shown in FIG. 7, the first turbine 105 and the parts connected therewith are rotated, and all parts are progressed in motion as in the second condition of normal operation, except that the second turbine 108 remains in negative reaction until a coupling point is reached. Progression from this condition toward unit rotation is as in the third condition of normal forward drive operation.

Figure 9:
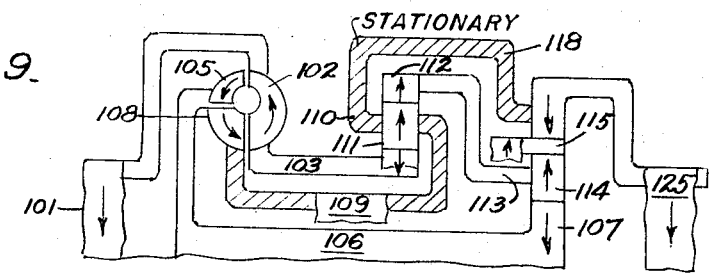
FIG. 9 is a similar view with the transmission of FIG. 1 in another optional type of forward drive for improving the response to torque demand in the mid-speed range.

FIG. 1 transmission: second forward drive option improving response to torque demand in the midspeed range In order to obtain the best possible response to torque demand in the mid-speed range, it is necessary (and possible in accordance with the stated objectives) to divide the torque in a manner wherein the best capabilities of the torque converter are readily and flexibly utilized. In fulfillment of this requirement, the second forward drive option is in continuation of the first forward drive option, and the transmission is conditioned in the same manner as in the foregoing explanation. This operation is shown schematically in FIG. 9.

To initiate the operation, unit rotation in the transmission at 1800 r.p.m. is interrupted as the engine speed is rapidly increased to 2700 r.p.m. The torque is redivided so that the load on the first turbine 105 holds the same, and the parts connected therewith to clockwise rotation at 1800 r.p.m. Fluid leaving the first turbine 105 impinges on the vanes of the second turbine 108 with such force and direction that the latter now performs as a stator and would go into counterclockwise rotation if that were possible; however, since the drum 129 is held, the backstop 128, the drum 120, and the one-way clutch 127 are now interlockingly interposed to prevent said clockwise rotation. The planet carrier 110 now being held, the planet gears 111 drive the annulus gear 112 and the planet carrier 113 in counterclockwise rotation at 1350 r.p.m.; the planet gears 114 being thus pivoted, and spurred by the sun gear 107, drive the annulus gear 115 and the sun gear 116 in counterclockwise rotation at 3150 r.p.m. The planet gears 121 being thus held in pivot position and spurred by the sun gear 116, drive the annulus gear 122 and the output shaft 125 at 1890 r.p.m.

Figure 14:
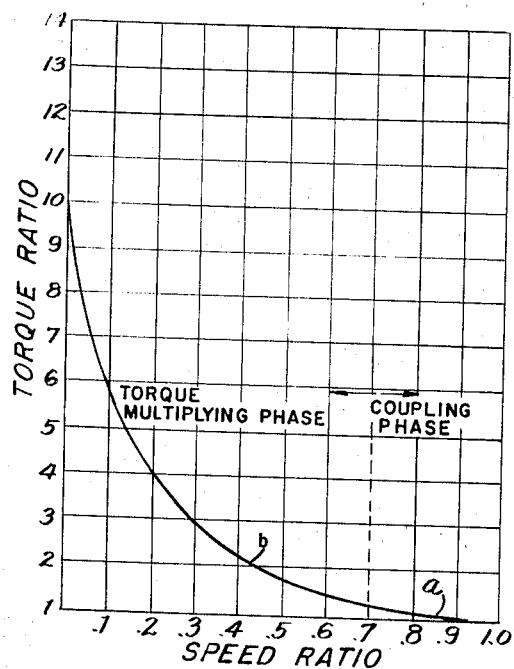
FIG. 14 is a graphical representation of some of the objective torque-speed characteristics of the transmission.

The torque-speed relationship produced in this manner is approximately indicated by curve $b$ of FIG. 14.

*A compact transmission with provision for selective control (FIG. 4)*

The modification of FIG. 4 substitutes two-way clutching between the reaction drum, herein indicated at 419 and either annulus gear 412 or planet carrier 410. (Parts corresponding to the parts of FIG. 1 are given the same two latter digits but are preceded by the digit 4.) For selectively connecting the drum 419 therewith, the drum 419 is in splined connection with a clutch coupling 433, movable longitudinally by manual means, as shown, or by any other convenient means and having a neutral position. This coupling is faced for connection with either a clutch 426, integral with the annulus gear 412, or a clutch 427, integral with the planet carrier 410. For selectively holding the drum 419 from retrograde rotation with respect to that of a sun gear 404, a friction element is indicated at 430 and is activated by any convenient means.

*Operation of the FIG. 4 transmission*

FIG. 4 is used to illustrate a third forward drive option. The input and output shafts rotate clockwise. The pitch ratios between the annulus and sun gear of the three respective gear sets may be, for example, 2:1, 3:1, and 3:1.

*FIG. 4 transmission: third forward drive option with improved mid-range torque*

In the embodiment of FIG. 4, forward drive from standing start toward top speed is available wherein the planet carrier 418 may be fully established for two-way rotation with either the annulus gear 412 or the planet carrier 413. Thus, in carrying out the stated objectives, it is possible to select between torque-speed progressions similar in continuity but requiring different applications of the torque converter phases.

In this drive option, the planet carrier 418 is connected for two-way rotation with the planet carrier 410 by means of the clutch 427 being engaged by the clutch coupling 433 (the alternative two-way connection hereinabove mentioned providing a forward drive progression essentially the same as in normal operation).

Figure 10:
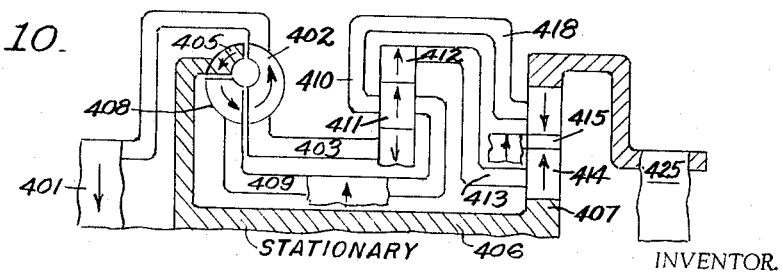
FIG. 10 is a similar view of the transmission of FIG. 4, which yields improved mid-range torque, shown in its no-output condition.

In the initial condition, shown schematically in FIG. 10, the annulus gear 422 and the output shaft 425 connected therewith are at rest as engine speed is increased to gain sufficient torque for moving the vehicle. The first turbine 405 is stalled by load reaction in the gearing and, consequently, by the geometry of the gearing the second turbine 408, now in fixed rotation with the planet carrier 418, must rotate counterclockwise at one-third the speed of the clockwise rotation of the input shaft 401 and the parts connected therewith. The annulus gear 412 must rotate counterclockwise at the speed of the clockwise rotation of the input shaft 401, and the annulus gear 415 must rotate counterclockwise at one and one-third times the clockwise speed of the input shaft 401.

In the second condition, the engine speed is sufficient for the torque required to move the vehicle. The first turbine 405 and the parts connected therewith begin to move clockwise. The second turbine 408, under diminished reaction impulse from the first turbine 405 as well as decreasing load reaction in the gearing, decreases from its initial counterclockwise rotation until it is stopped from rotation. During this interval the torque converter has been operated in a modified form of its normal converter phase, wherein counterclockwise reaction rotation of the turbine 405 as a stator has been reactively limited, but not precluded. In this interval the counterclockwise rotation of the annulus gears 412 and 415 is reduced, and in conjunction with clockwise rotation of the sun gear 407, rotatable with the first turbine 405, and the stationary pivoting of the planet gears 411 and 418, the annulus gear 422 and the output shaft 425 are rotated clockwise. This condition is essentially the same as the operation described above in the second forward drive option and as is also substantially shown by FIG. 9.

In the third condition, the torque converter goes into coupling, progressing all components in the planetary gearing into clockwise rotation until input and output torques and speeds are equalized, and unit rotation is effected in the entire transmission.

*A heavy duty transmission for use in trucks, buses, locomotives, and the like (FIG. 5)*

The modified form of the transmission shown in FIG. 5 incorporates a counter shaft and gear arrangement for controlling a planet carrier 518. (The reference numerals correspond substantially to those of FIG. 1 raised to the 500's.) In lieu of the drums 119 and 120, a counter shaft 519 is in intermediate connection between a planet carrier 518 and either an annulus gear 512 or a planet carrier 510. A one-way clutch 526 is mounted between a hub of the counter shaft 519 and a spur gear 534, the latter being meshed with an external gear 535 integral with an annulus gear 512. A one-way clutch 527 is mounted between a hub of the countershaft 519 and a spur gear 536, the latter being meshed with an external gear 537 integral with the planet carrier 510. A backstop 528 is mounted between a hub of the countershaft 519 and a drum 529. The countershaft 519 is integral with a spur gear 538, the latter being meshed with an external gear 539, integral with the planet carrier 518. Braking surfaces are provided for the annulus gears 512 and 515 and for the external gear 539 and the drum 529. Friction holding elements for the same are indicated, respectively, at 540, 541, 530 and 531, and may be actuated by any convenient means. One-way clutches 526 and 527, and backstop 528, although acting in opposite immediate rotation to that of one-way clutches 126 and 127 and backstop 128, respectively of FIG. 1, perform the objective functions assigned hereinabove to the latter.

For selectively establishing the planet carrier 518 in two-way rotation with either the annulus gear 512 or the planet carrier 510, a clutch coupling 533 is splined with the countershaft 519 for sliding, and faced for connection, respectively, with either a clutch 541, integral with the spur gear 534 or a clutch 543 integral with the spur gear 536. Of course, the clutch coupling 533 may be placed in a neutral connection connected to neither spur gear 534 or 536.

*Operation of the FIG. 5 transmission*

The embodiment of FIG. 5 is referred to for stepped operation, reverse drive and reverse forward alternation; input shaft rotation is clockwise and output shaft rotation is clockwise and counterclockwise in reverse drive; the pitch ratio between annulus and sun gear of each gear set is 2:1. In all three gear sets, the external gear and the spur gear meshed therewith have the same pitch ratio.

The transmission of FIG. 5: stepped operation

In the form of the invention embodied in FIG. 5, five intermediate braking ratios, and also five intermediate power ratios are available between a standing start and top speed. Any of said ratios may be effected in interruption of the aforementioned normal or optional forward drive operations.

*In the first speed for braking.*—The annulus gear 515 is held by the element 541; the first turbine 505 and the parts connected therewith rotate with the pump 502 and the parts connected therewith at 1800 r.p.m., interposing the one-way clutch 544. The annulus gear 512 and planet carrier 513, carrying the planet gears 514, must follow in clockwise rotation at 600 r.p.m. The second turbine 508 and the planet carrier 510, carrying the planet gears 511, must follow in intermediate clockwise rotation at 1000 r.p.m. The one-way clutch 527, being brakingly interposed, through the external gear 537, the spur gear 536, the countershaft 519, the spur gear 538 and the external gear 539 now limit the planet carrier 518 to clockwise rotation at 1000 r.p.m. The planet gears 521, being thus pivoted, must now limit the rotation of the annulus gear 522 and the output shaft 525 to 1500 r.p.m.

*In the second speed for braking.*—The annulus gear 512 is held by the element 540. The pump 502 and the first turbine 505 and the parts connected therewith rotate as in the first condition. The planet gears 514, being held in pivot position and spurred by the sun gear 507, rotate the annulus gear 515 and the sun gear 516 counterclockwise at 900 r.p.m. The second turbine 508 and the planet carrier 510, carrying the planet gears 511, must rotate clockwise at 600 r.p.m. The one-way clutch 527 is brakingly interposed and, by gear means the same as in the first speed, limits the planet carrier 518 to 600 r.p.m. The annulus gear 522 and the output shaft 525 must now rotate at 1350 r.p.m.

*In the third speed for braking.*—The planet carrier 518 is held by the element 530. The conditions in the first and second speeds apply except that the planet carrier 510 and the second turbine 508 must now be held by reaction in the gearing. The annulus gear 512 and the planet carrier 513 now rotate counterclockwise at 900 r.p.m. The planet gears 514 being thus pinioned, and spurred by the sun gear 507, now rotate the annulus gear 515 and the sun gear 516 clockwise at 2250 r.p.m. The one-way clutch 527 remaining interposed by reaction in the gearing, the planet gears 521 are thus held in pivot position and spurred by the sun gear 516 to rotate the annulus gear 522 and the output shaft 525 at 1125 r.p.m.

*In the fourth and fifth speeds for braking.*—The clutch 542 is engaged by the clutch coupling 533, and through the countershaft gearing establishes the planet carrier 518 for rotation with the annulus gear 512.

*In the fourth speed for braking.*—The annulus gear 515 is held by the friction element 541. The conditions obtaining in the first speed apply, except that the planet carrier 518 must now rotate clockwise with the annulus gear 512 at 600 r.p.m. The planet gears 521 being thus pinioned must limit the rotation of the annulus gear 522 and the output shaft 525 to 900 r.p.m.

*In the fifth speed for braking.*—The annulus gear 512 is held by the element 540. The conditions obtaining in the second speed apply, except that the planet carrier 518 is now held with the annulus gear 512. The planet gears 514 being thus held in pivot position, and spurred by the sun gear 507, rotate the annulus gear 515 clockwise at 900 r.p.m. The planet gears 521 being held in pivot position and spurred by the sun gear 516, rotate the annulus gear 522 and the output shaft 525 at 450 r.p.m.

The foregoing output speeds are the absolute maximum and are calculated with drag on the first turbine 505 neglected. Stepped operation under power, yields output speeds corresponding to, but less than, the foregoing, since both the load and the aforementioned fluid drag in the first turbine 505 will normally hold the same at less than full coupling with the pump 502. The first, second and third speeds under power require that the clutch 543 be engaged by the clutch coupling 533 while the fourth and fifth speeds under power may be obtained by the clutch means for the same speeds in braking, or by the automatic interposition of the one-way clutch 526.

FIG. 5 transmission: reverse operation

To condition the transmission for reverse drive, the output shaft 525 is now connected to the reverse output clutch 517 by means of the clutch coupling 524. The friction element 540 holds the annulus gear 512 and the planet carrier 513. In the embodiments of FIGS. 1 and 4, reverse drive may be set up by the corresponding output shaft connections and by actuating the friction elements 130 and 430, respectively.

Figure 11:
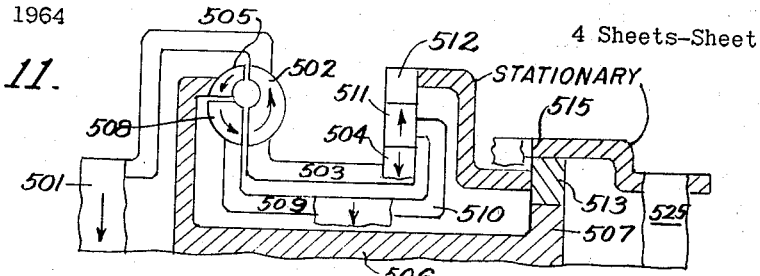
FIG. 11 is a similar view of the transmission of FIG. 5 in reverse operation, in its initial no-output condition.

In the initial condition, schematically shown in FIG. 11, the planet carrier 510 and the parts connected therewith follow the sun gear 504 and the parts connected therewith at one-third the input speed; the sun gear 507 remains at rest under the load imposed thereon by the annulus gear 515 and the output shaft 525 through the planet gears 514, being held in pivot position.

Figure 12:
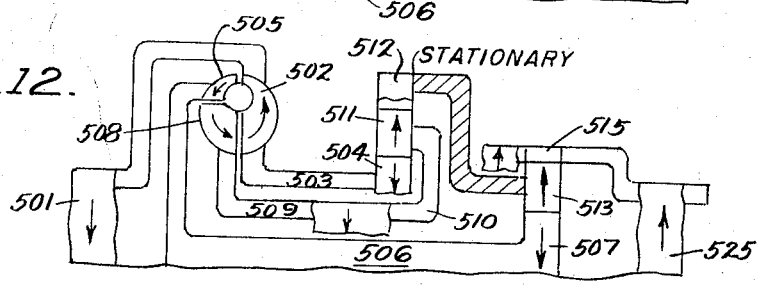
FIG. 12 is a similar view of the transmission of FIG. 5 with reverse operation in effect.

In the second condition, shown schematically in FIG. 12, the input torque is sufficient for moving the vehicle and the first turbine 505 and parts connected therewith under impulse of the oil from the pump 502 begins to rotate likewise, the annulus gear 515 and the output shaft 525 are now rotated counterclockwise at one-half the clockwise speed of said second turbine 505.

Figure 13:
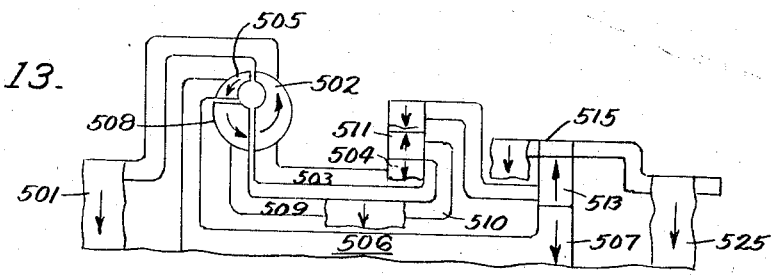
FIG. 13 is a similar view of the transmission of FIG. 5 in forward drive.

A reverse forward drive alternation may be obtained without changing the immediately foregoing output shaft connection, by alternatively holding and releasing the annulus gear 512. When this is done in conjunction with proper engine throttling, the second turbine 508 and the parts connected therewith will follow the first turbine 505 and the parts connected therewith as the output load is decreased and output momentum increased, permitting the converter and the gearing to go into coupling. In this condition the annulus gear 515 and the output shaft 525 are progressively reversed from counterclockwise to clockwise rotation, as shown schematically in FIG. 13.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A transmission having input and output structures and pump and first and second turbine members of hydrodynamic torus means, said pump being driven by said input structure, including, in combination therewith,
   first and second epicyclic gear trains each having an input member, a planet gear carrier and planet gears, and an output member,
   said first epicyclic gear train having its planet gear carrier connected to the output member of said second epicyclic gear train, for rotation together when either one of them rotates,
   said second epicyclic gear train having its input member and planet gear carrier so operatively connected to said input structure and said first turbine member as to combine the rotations of said input structure and first turbine member, said output member of said first gear train being connected to said output structure, and
   said second turbine member being connected to said input member of said first gear train and thereby driving said output structure through said first epicyclic gear train.

2. In a transmission having input and output structures, a pump operatively connected to the input structure, and first and second turbine members of an hydrodynamic torus means, the combination therewith of a first sun gear rotatable with said pump member, a second sun gear rotatable with said first turbine member, a first planet carrier rotatable with said second turbine member, first planet gears carried by said first planet carrier and meshed with one of said sun gears, a first annulus gear also meshed with said first planet gears, a second planet carrier rotatable with said first annulus gear, second planet gears carried by said second planet carrier and meshed with the other of said sun gears than the one meshed with said first planet gears, and a second annulus gear meshed with said second planet gears, said output structure being driven by said second annulus gear so that said second planet gears are in driving connection with the output structure, said second planet gears, the sun gear with which they are meshed, and said second annulus gear constituting a pair of epicyclic gear trains in mutual reaction, whereby turbine rotation in the same direction as pump rotation is reactively induced under an initial condition wherein the input structure is rotated and the output structure is at rest, and the transmission is progressed toward overall coupling as the turbine members are progressed toward coupling with the pump.

3. In a transmission having input and output structures, a pump operatively connected to the input structure, and first and second turbine members of an hydrodynamic torus means, the combination therewith of a first sun gear rotatable with said pump member, a second sun gear rotatable with said first turbine member, a first planet carrier rotatable with said second turbine member, first planet gears carried by said first planet carrier and meshed with one of said sun gears, a first annulus gear also meshed with said first planet gears, a second planet carrier rotatable with said first annulus gear, second planet gears carried by said second planet carrier and meshed with the other of said sun gears than the one meshed with said first planet gears, said second planet gears being in driving connection with the output structure.

4. The transmission of claim 3 having a second annulus gear meshed with said second planet gears and driving said output structure.

5. In a transmission having input and output structures, a pump operatively connected to the input structure, and first and second turbine members of an hydrodynamic torus device, the combination therewith of a first sun gear rotatable with said pump member, a second sun gear rotatable with a said first turbine member, a first planet carrier rotatable with a said second turbine member, first planet gears carried by said first planet carrier and meshed with one of said sun gears, a first annulus gear also meshed with said first planet gears, a second planet carrier rotatable with said first annulus gear, second planet gears carried by said second planet carrier and meshed with the other of said sun gears than the one meshed with said first planet gears, a second annulus gear meshed with said second planet gears, a third sun gear rotatable with said second annulus gear, a third planet carrier rotatable with said first annulus gear, a third annulus gear operatively connected to said output structure, and third planet gears meshed with said third sun gear and with said third annulus gear carried by said third planet carrier.

6. The combination of claim 5 wherein said third planet carrier is connected to said first annulus gear by releasable clutch means.

7. The combination of claim 6 wherein said clutch means is a one-way clutch.

8. The combination of claim 5 wherein said third planet carrier is connected to said first annulus gear by countershaft means connected to said third planet carrier through first spur gearing and releasable clutch means connecting said countershaft means by second spur gearing to said first annulus gear.

9. The combination of claim 5 including means for holding said third planet carrier stationary during operation of said transmission.

10. The combination of claim 5 including means for holding said first annulus gear stationary during operation of said transmission.

11. The combination of claim 5 including means for holding said second annulus gear stationary during operation of said transmission.

12. In a transmission having input and output structures, a pump operatively connected to the input structure, and first and second turbine members of an hydrodynamic torus device, the combination therewith of a first sun gear rotatable with said pump member, a second sun gear rotatable with a said first turbine member, a first planet carrier rotatable with a said first turbine member, a first planet carrier rotatable with a said second turbine member, first planet gears carried by said first planet carrier and meshed with one of said sun gears, a first annulus gear also meshed with said first planet gears, a second planet carrier rotatable with said first annulus gear, second planet gears carried by said second planet carrier and meshed with the other of said sun gears than the one meshed with said first planet gears, a second annulus gear meshed with said second planet gears, a third sun gear, a second annulus gear rotatable with said third sun gear, a third planet carrier rotatable with said first planet carrier, a third annulus gear operatively connected to said output structure, and third planet gears meshed with said third sun gear and with said third annulus gear and carried by said third planet carrier.

13. The combination of claim 12 wherein said third planet carrier is connected to said first planet carrier by clutch means.

14. The combination of claim 12 wherein said third planet carrier is connected to said first planet carrier by countershaft means connected to said third planet carrier through first spur gearing and releasable clutch means connecting said countershaft means by second spur gearing to said first planet carrier.

15. The combination of claim 12 including means for holding said third planet carrier stationary during operation of said transmission.

16. The combination of claim 12 including means for holding said first annulus gear stationary during operation of said transmission.

17. The combination of claim 12 including means for holding said second annulus gear stationary during operation of said transmission.

18. In a transmission having input and output structures, a pump operatively connected to the input structure, and first and second turbine members of an hydrodynamic torus means, the combination therewith of a first sun gear rotatable with said pump member, a second sun gear rotatable with a said first turbine member, a first planet carrier rotatable with a said second turbine member, first planet gears carried by said first planet carrier and meshed with one of said sun gears, a first annulus gear also meshed with said first planet gears, a second planet carrier rotatable with said first annulus gear, second planet gears carried by said second planet carrier and meshed with the other of said sun gears than the one meshed with said first planet gears, a second annulus gear meshed with said second planet gears, a third sun gear, a second annulus gear rotatable with said third sun gear, a third planet carrier, first disengageable means for causing said third planet carrier to rotate with said first annulus gear, second disengageable means for causing said third planet carrier to rotate with said first planet carrier instead of with said first annulus gear, a third annulus gear operatively connected to said output structure, third planet gears meshed with said third sun gear and with said third annulus gear and carried by said third planet carrier.

19. The combination of claim 18 wherein both said disengageable means comprise clutch means.

20. The combination of claim 19 wherein said clutch means comprise one-way clutch means.

21. The combination of claim 19 wherein both said disengageable means comprise a countershaft and first spur gear means connecting said countershaft to said third planet carrier, a three-position clutch having a neutral position and first and second active positions, spur gear means connecting said clutch to said first annulus gear when said clutch is in its said first position, and third spur gear means connecting said clutch to said first planet carrier when said clutch is in its said second position.

References Cited by the Examiner

UNITED STATES PATENTS

| | | | |
|---|---|---|---|
| 2,280,015 | 4/1942 | Tipton | 74—732 X |
| 2,312,849 | 2/1943 | Pollard | 74—688 |
| 2,324,713 | 7/1943 | McFarland | 74—688 |
| 2,548,272 | 4/1951 | Seybold | 74—677 |
| 2,572,007 | 10/1951 | Burtnett | 74—688 |
| 2,737,062 | 3/1956 | Kiss | 74—688 |
| 3,000,234 | 9/1961 | Burtnett | 74—677 |
| 3,030,824 | 4/1962 | Moore | 74—677 |
| 3,073,182 | 1/1963 | Harmon | 74—688 |
| 3,132,535 | 5/1964 | Borman et al. | 74—688 |

FOREIGN PATENTS

| | | |
|---|---|---|
| 451,475 | 9/1949 | Italy. |

DAVID J. WILLIAMOWSKY, *Primary Examiner.*
THOMAS C. PERRY, *Examiner.*